United States Patent [19]

Vinel et al.

[11] 4,243,130
[45] Jan. 6, 1981

[54] SELF-CENTERING CLUTCH RELEASE BEARING COMPRISING GUIDE MEANS

[75] Inventors: Rene Vinel, Bourg la Reine; Jean-Pierre Querton, Maisons Alfort; Claude Serville, Clamart, all of France

[73] Assignee: SKF Compagnie d'Applications Mecaniques, Clamart, France

[21] Appl. No.: 904,707

[22] Filed: May 10, 1978

[30] Foreign Application Priority Data

May 16, 1977 [FR] France ............................. 77 14977

[51] Int. Cl.³ ............................................. F16D 23/14
[52] U.S. Cl. .................................... 192/98; 192/110 B
[58] Field of Search ............................. 192/98, 110 B

[56] References Cited

U.S. PATENT DOCUMENTS

| 3,741,361 | 6/1973 | Brandenstein | 192/98 |
|---|---|---|---|
| 3,967,710 | 7/1976 | Ernst et al. | |
| 4,093,053 | 6/1978 | Ernst et al. | |
| 4,094,394 | 6/1978 | Koder et al. | |
| 4,119,187 | 10/1978 | Ernst et al. | |
| 4,125,181 | 11/1978 | Stenzinger | |
| 4,142,618 | 3/1979 | Fontaine et al. | |

Primary Examiner—Allan D. Herrmann
Attorney, Agent, or Firm—Beveridge, DeGrandi, Kline & Lunsford

[57] ABSTRACT

A clutch release bearing is supported on a guide tube by an axially slidable support sleeve which has a radial flange. The inner ring of the bearing has a radial extension which is in surface-to-surface contact with one side of the guide tube flange to prevent tilting of the release bearing. The opposite side of the guide tube flange has elastic projections which are clamped by claws on the radial extension.

9 Claims, 6 Drawing Figures

SELF-CENTERING CLUTCH RELEASE BEARING COMPRISING GUIDE MEANS

The present invention relates to a self-centering clutch release bearing for plate clutches and more particularly for diaphragm clutches, the said release bearing comprising a rolling bearing, for example a ball bearing, and means which allow axial sliding on a fixed guide tube inside which revolves the shaft of the gearbox, and which allow substantially radial movement of the whole of the release bearing so as to bring it into a position which is correctly centered relative to the diaphragm, this position being maintained after the declutching operation.

The clutch release bearings of this type, comprising a ball bearing or the like, must preferably be provided with elastic means which allow a certain movement of the release bearing relative to the shaft of the gearbox of the vehicle or relative to the guide tube on which the release bearing moves. One of the two rings of the ball-race of such a release bearing in fact transmits the declutching force and comes into direct contact with the diaphragm, or remains continuously in contact with the diaphragm, whilst the other ring receives the thrust of the declutching release yoke. The ring which comes into contact, or remains in contact, with the diaphragm, for example the inner ring of the ball-race, generally has a toric support face, since the release bearing is not precisely centered on the shaft of the gearbox. Furthermore, the geometrical axis of the clutch diaphragm, its axis of rotation and the axis of the shaft of the gearbox or of the guide tube do not always coincide exactly, which makes it still more necessary to provide a possible means of movement of the release bearing relative to the guide tube.

There has already been proposed, especially according to French Pat. No. 1,467,848, a clutch release bearing capable of centering automatically during a declutching operation and of remaining in this centered position after the declutching. This type of clutch release bearing comprises a ball-race of which one of the rings is in frictional contact with a washer against which it is applied axially by a spring device.

In the case, which can frequently occur in practice, where the different teeth of the diaphragm of the clutch coming into contact with one of the rings of the ball-race of the release bearing do not all occupy the same positions, the coming into contact of the release bearing with the diaphragm of the clutch tends to cause the said release bearing to pivot about an axis at right angles to the normal axis of movement of the release bearing. If such a clutch release bearing of a known type is actuated by means of a release yoke mounted on a swivel, there is no means of preventing a pivoting movement of the release bearing, which results in premature wear of the contact surface of the diaphragm.

It has already been proposed, for example in German Published Application No. 2,457,352 or in French Pat. No. 2,304,828, to mount the ball-race of the release bearing on a rigid guide sleeve which can comprise a radial flange which may be detachable. In these earlier embodiments, one of the rings of the ball-race can thus move, either directly or via a detachable component, during the automatic centering, in frictional contact along the surface of the radial flange of the said guide sleeve.

The contact surface between the ring of the ball-race and the radial flange of the guide sleeve is, however, small and the elastic means of axial tightening which ensure that the release bearing is held in a centered position always consist of spring devices of a complex stucture, such as, for example, Belleville rings, which require the use of supplementary components.

It is an object of the present invention to permit the production of a clutch release bearing of the type mentioned above which comprises guide means which avoid any pivoting of the clutch release bearing, regardless of the inaccuracies of manufacture of the diaphragm and the method of mounting of the clutch release yoke, with the means of axial tightening which ensure that the release bearing is held in a centered position being produced in a particularly simple manner and without the addition of supplementary components.

The self-centering clutch release bearing of the invention comprises a ball-race or the like equipped with inner and outer rings, which are preferably thin-walled and are produced by stamping a metal sheet or a tube. The inner ring can slide on a guide tube via a support sleeve which can slide axially with the bearing in an axial direction relative to the guide tube. The release bearing also comprises means of axial elastic tightening between one of the rings of the bearing and the support sleeve so as to permit radial movement of the said bearing and to permit holding the release bearing in a centered position after this movement.

According to the invention, the support sleeve has a large guide portion which is in contact with the surface of the guide tube, and a radial flange provided, on its face opposite the said bearing, with projecting elastic means. The inner ring of the bearing has a radial extension which is in contact, over a major part of its surface, with the radial flange of the sleeve, and is provided with projecting claws which clamp a portion of the said radial flange at right angles to the abovementioned elastic means.

In this way, the axial elastic tightening is achieved by means of the existence of elastic means which form an integral part of the support sleeve itself. The sleeve can advantageously be produced by moulding, for example by moulding a plastic which has the rigidity required for the functioning of the release bearing. The axial elastic tightening is furthermore achieved by virtue of the particular structure of the inner ring of the bearing, of which the extensions co-operate with the projecting elastic means of the support sleeve.

There is contact, over a large surface area, between the inner ring of the ball-race, by its radial extension, and the radial flange of the sleeve, thus avoiding any pivoting of the release bearing during the declutching operation, since the radial flange fixed to the support sleeve is, by virtue of this fact, perfectly guided, in its sliding movement, relative to the guide tube.

The present invention will be better understood on studying some embodiments described by way of examples which in no way imply a limitation and are illustrated by the attached drawings, in which.

Figure 1:
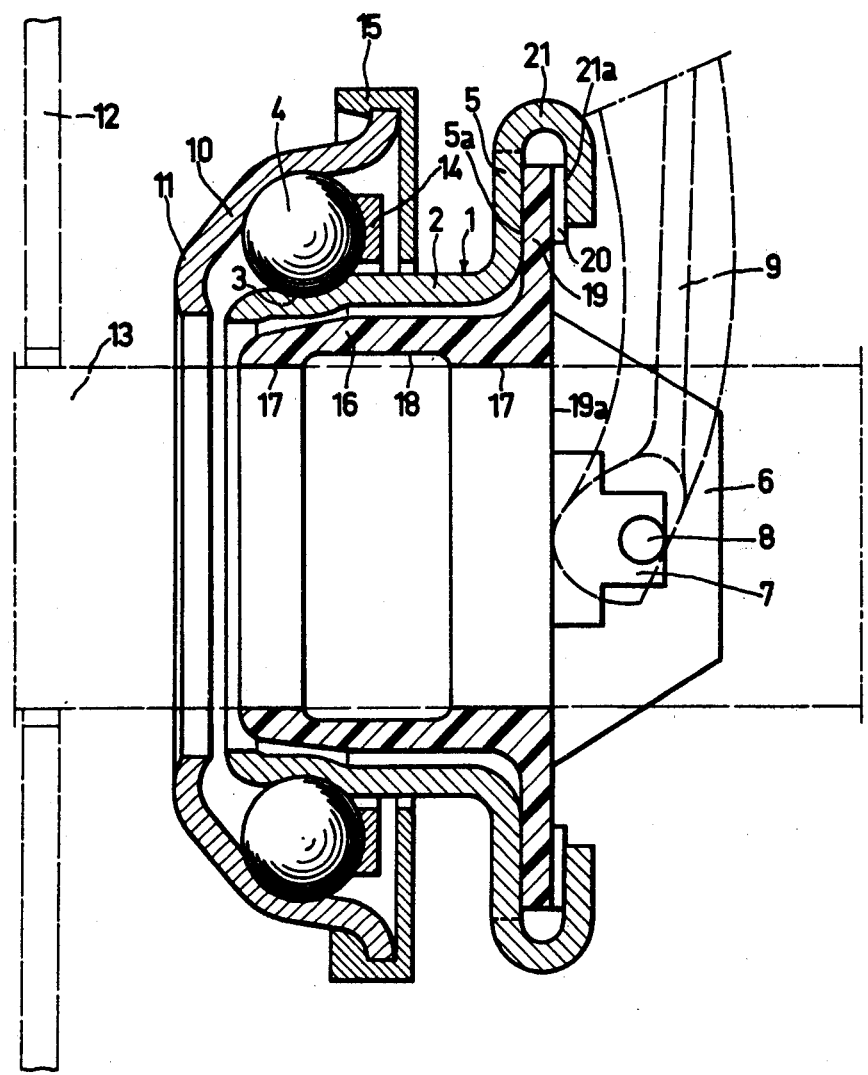
FIG. 1 is a view in section along I—I of FIG. 2, of a first embodiment of a clutch release bearing according to the invention.
Figure 2:
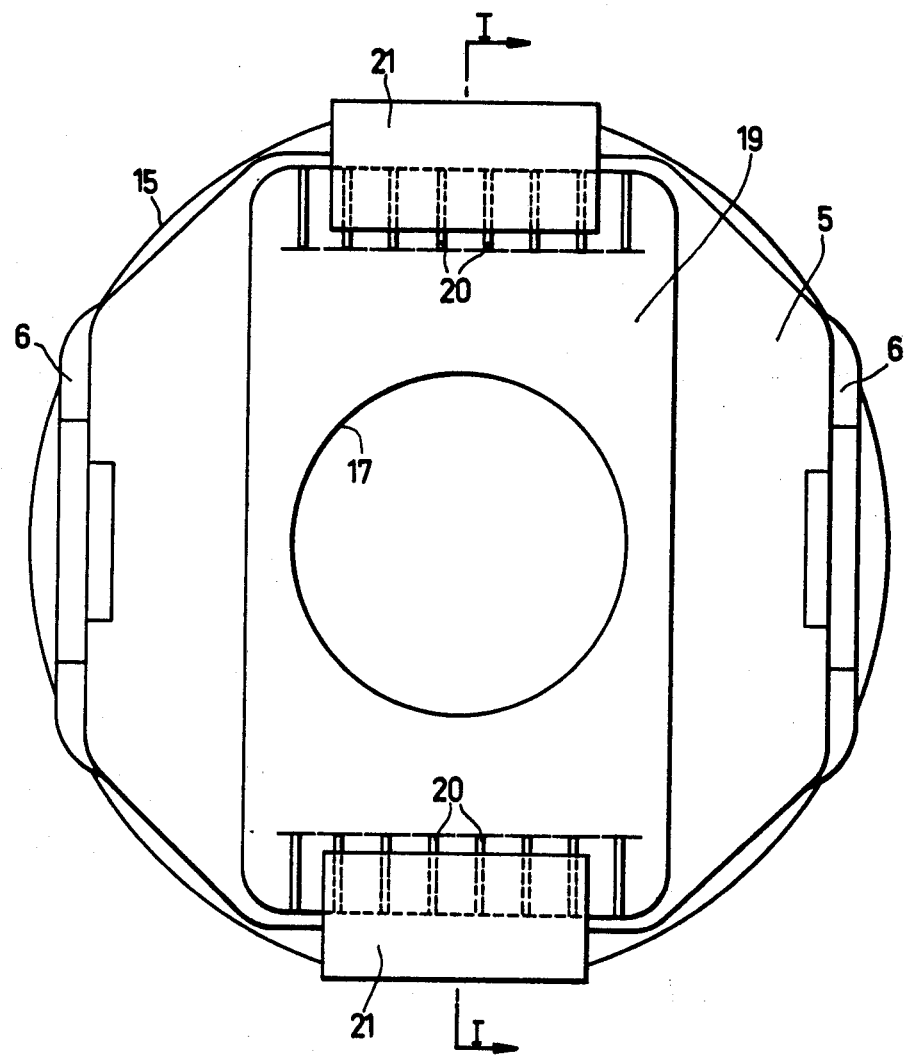
FIG. 2 is a lateral external view of the clutch release bearing of FIG. 1, in particular showing the means of axial tightening and the shape of the inner ring of the bearing.

As shown in FIGS. 1 and 2, it will be seen that the clutch release bearing according to the invention comprises an inner ring 1 of a ball-race, which ring is thin-walled, as produced by stamping a metal sheet or a tube, and has a tubular part 2 and a toric roller track 3 for a set of balls 4. The tubular part 2 is integral with a radial extension 5 which is itself extended laterally by two lugs 6 parallel to the axis of the release bearing and each possessing a cut-out 7 which co-operates with a holding spindle 8 of the control release yoke 9, these elements being shown in broken lines in FIG. 1. It will, of course, be appreciated that other means of fixing of the release yoke could be envisaged.

The ball-race of the clutch release bearing is completed by an outer ring 10, also having a thin wall, produced by stamping a metal sheet or a tube. The said outer ring possesses a toric portion 11, which can come into contact with the surface of the diaphragm 12 or with a similar element, shown in broken lines in FIG. 1, when the release yoke 9 has caused a longitudinal movement of the release bearing relative to the guide tube 13 which is shown in broken lines in FIG. 1 and inside which revolves the shaft of the gearbox. The balls are held by a cage 14, the race being protected by a cover 15.

According to the invention, a support sleeve 16 produced of a suitably rigid material, which can for example be a moulded plastic, has a tubular guide portion 17 in contact with the surface of the guide tube 13. In the embodiment shown in FIG. 1, a central recess 18 which serves as a lubricant reserve can advantageously be provided and divides the guide portion 17 into two separate portions without detracting from the standard of guiding of the sleeve. As can be seen, the guiding length of the support sleeve 16 is substantially equal to the total length of the clutch release bearing so that the best possible guiding is achieved.

The sleeve 16 furthermore possesses a radial flange 19 which forms an integral part of the said sleeve and is preferably produced by moulding. The radial flange 19 which in cross-section has a substantially rectangular shape, as can be seen in FIG. 2, is provided, on its face 19a opposite the bearing, with two sets of parallel ridges 20 arranged symmetrically relative to the axis of the release bearing. The projecting parallel ridges 20 act as resilient tongues which are arranged over a portion of the surface 19a of the radial flange 19 in the vicinity of two side ends of the latter.

The radial extension 5 of the inner ring 1 of the bearing has two projecting claws 21, preferably of lesser width than that of the flange 19, and consisting of a folded-over portion of the said radial extension 5, which claws inwardly clamp the said radial flange 19 and come into contact with the ridges 20. Each of the claws 21 thus co-operates with the central portion of one of the rows of ridges 20. The folded-over portion of the radial extension 5 is such that the inner ring 1 has two parallel radial surfaces of which one, reference 5a, points away from the bearing and comes into contact, over almost its whole area, with the radial flange 19 of the sleeve, whilst the other surface, reference 21a, points towards the bearing and comes into contact, as has been stated, with the free ends of a part of the ridges 20. The other ridges 20, which are not compressed by the claws 21, furthermore make it possible to avoid any disengagement, by relative rotation, between the inner ring 1 and the sleeve 16.

As may be noted, the surface of contact between the radial flange 19 and the surface 5a of the radial extension 5 of the inner ring of the bearing is so arranged as to be as large as possible, thereby avoiding any pivoting of the release bearing of the invention during an operation of the declutching release yoke 9 in a case where the teeth of the diaphragm 12 have some irregularities.

The ridges 20 are advantageously so constructed as to have a profile which becomes thinner in the outward direction, so as to impart to them a certain elasticity. The axial tightening thus produced by the claws 21 co-operating with the said ridges 20 ensures the self-centering of the release bearing, which can, in its entirety, move in a radial plane relative to the support sleeve 16, suitably guided by the surface 17 in contact with the guide tube 13. Once the release bearing has been centered in this way, it remains in position because of the existence of the axial elastic tightening exerted by the claws 21 co-operating with the ridges 20. Though two claws 21 have been shown, it will, of course, be understood that a larger number could be produced without difficulty.

Thus, ultimately a self-centering of the release bearing is achieved and, unlike the case of previous bearings, this bearing can no longer pivot, regardless of the method of mounting of the declutching release yoke.

Figure 3:
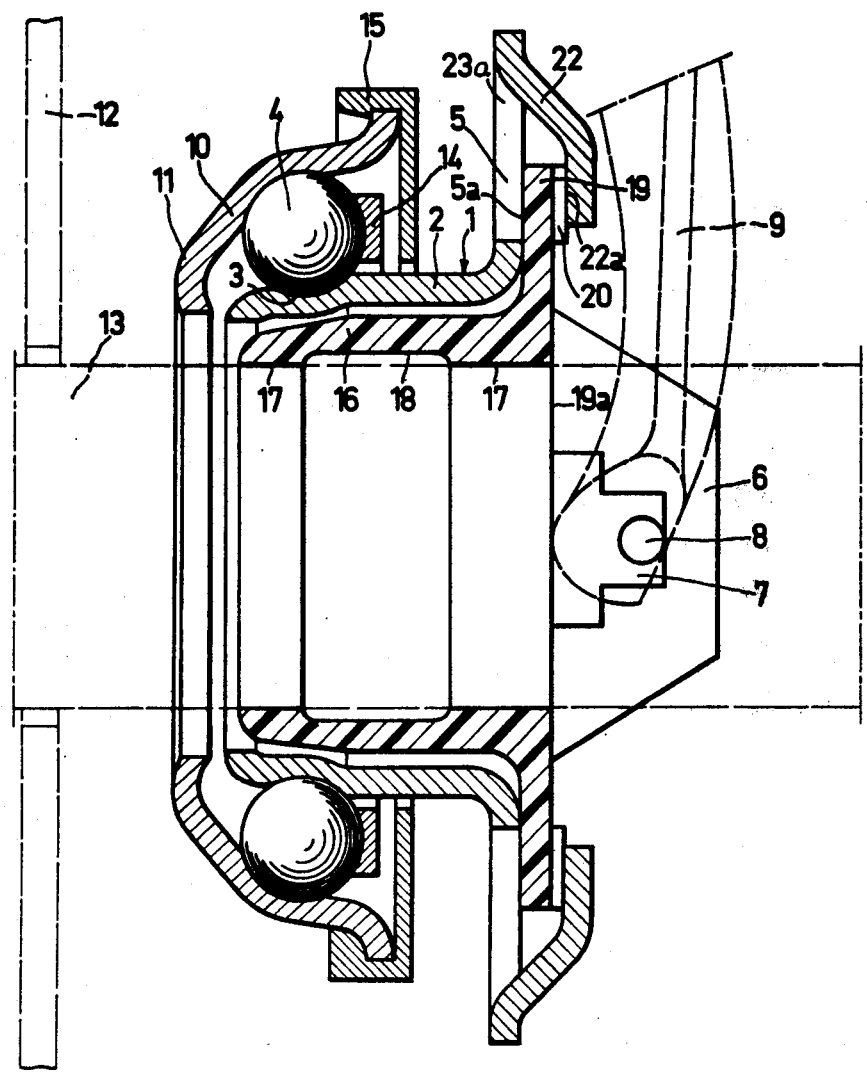
FIG. 3 is a view in section similar to FIG. 1 of a different embodiment of a release bearing according to the invention.

FIG. 3 illustrates a different embodiment of a clutch release bearing according to the invention. In this figure, the same elements carry the same reference numbers. The embodiment illustrated in FIG. 3 only differs from that illustrated in FIGS. 1 and 2 in the structure of the projecting claws of the radial extension 5, which in this case are produced by upsetting of material 22 obtained by stamping the inner ring 1. At least two localised portions 23a of width less than that of the radial flange 19 of the sleeve 16 are cut out in positions which are symmetrical relative to the axis of the release bearing, on the opposite extreme edges of the radial extension 5, and the material is then folded so as to create a radial surface 22a pointing towards the bearing and coming into contact with the ridges 20 so as to provide the abovementioned axial tightening. As will be noted in FIG. 3, the claws 22 point towards the axis of the release bearing, as was the case in FIG. 1 for the folded-over portions 21, so that the claws 22 again clamp the radial flange 19 from the outside. As in the embodiment of FIG. 1, the radial extension 5 of the inner ring 1 has, on each side of the claws 22, a large radial surface 5a in contact with the flange 19 of the support sleeve 16 so as to avoid any pivoting of the release bearing.

Figure 4:
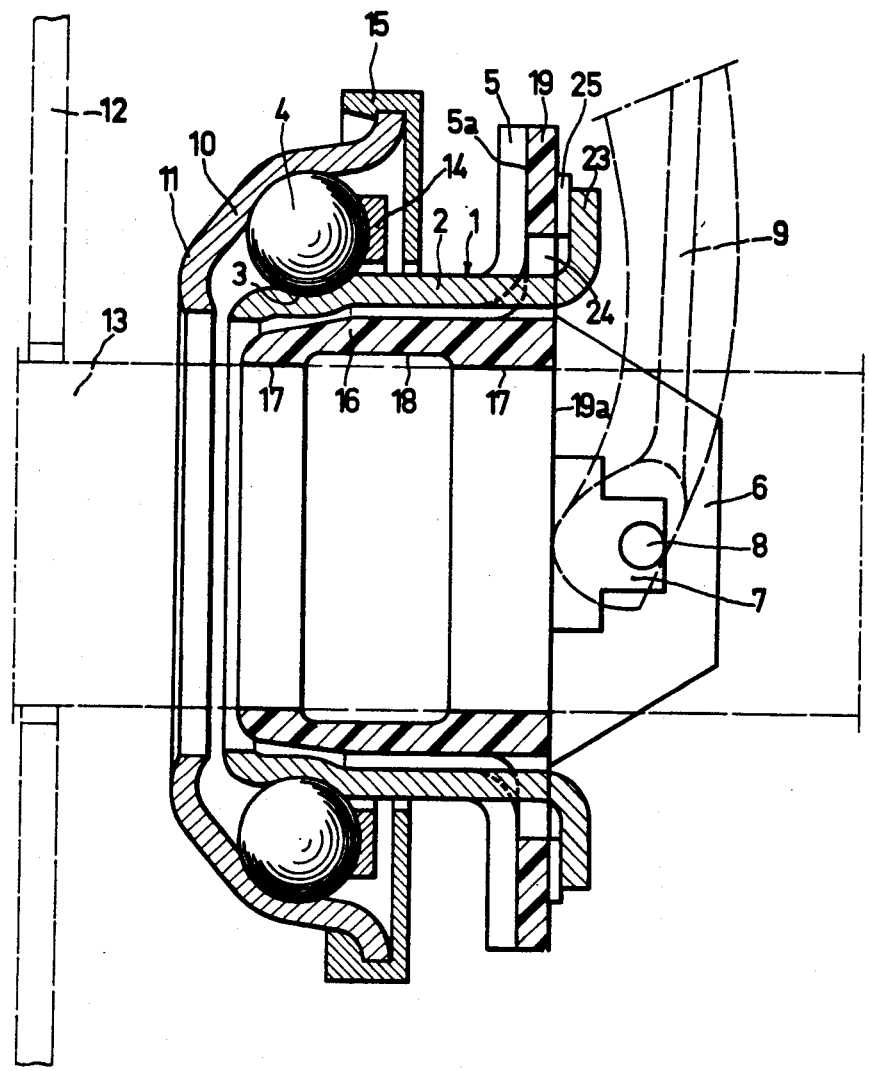
FIG. 4 is a view in section similar to FIG. 1 of a different embodiment of a release bearing according to the invention.

In the embodiment of FIG. 4, where the same elements carry the same reference numbers, the axial tightening of the inner ring 1 on to the support sleeve 16 is achieved as in the embodiment of FIG. 3 by projecting claws 23 consisting of an upset portion of material obtained by stamping of the radial extension 5. However, in this embodiment the projecting claws 23 clamp the radial flange 19 from within and for this purpose they extend through slots 24 produced in the said radial flange 19, the sizes of which slots can be selected to allow assembly. The ridges 25 have the same structure as the ridges 20 of the preceding embodiments but are located closer to the axis of rotation of the release bearing so as to be able to co-operate suitably with the projecting claws 23 which clamp the radial flange 19 on the outside and are hence also closer to the axis of rotation of the release bearing than in the other embodiments.

Figure 6:
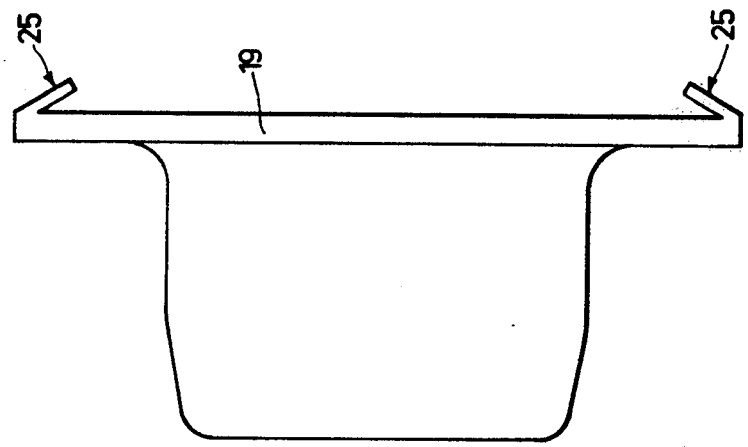
FIG. 6 is an elevation view of the sleeve of FIG. 5.
Figure 5:
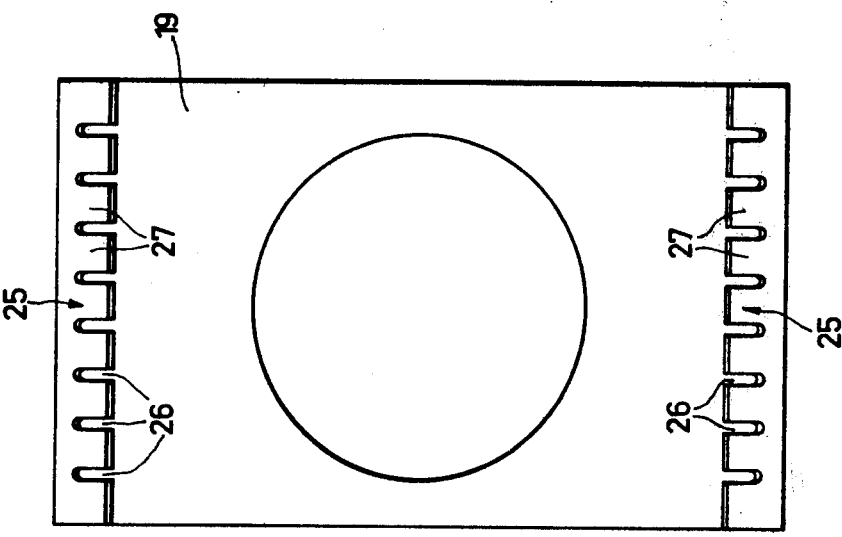
FIG. 5 is a side view of a variant of a support sleeve which can be used in a release bearing according to the invention.

FIGS. 5 and 6 illustrate another embodiment of the support sleeve which only differs from the sleeve 16 in respect of the structure of the elastic means of axial tightening. As can be seen in FIGS. 5 and 6 the elastic means here consist of a folded-over portion 25 near the edges of the radial flange 19. In order to improve the elasticity of the said portion 25 a plurality of slots 26 cuts the portion 25 into tongues 27 which are slightly inclined relative to the radial plane of the flange 19. It will be appreciated that the support sleeve can not only be produced from a suitably rigid plastic but also from metal and in particular from stamped sheet metal.

As a result of the particular structure of the support sleeve which possesses elastic means of tightening fixed to it, and has a large radial guide surface, a self-centering release bearing is obtained which is not subjected to any pivoting during actuation of the declutching release yoke, thus considerably reducing the wear of the components in contact during each declutching operation.

We claim:

1. A self-centering clutch release bearing assembly comprising an antifriction bearing having a plurality of bearing elements located between an inner ring and an outer ring, said inner ring having a radial extension, an axially slidable supporting element supporting said bearing, said supporting element having an internal guiding surface for contacting a guide tube, said supporting element including a radial flange having one face with a radial surface portion which bears against said radial extension of said inner ring of said bearing, said radial flange having integral elastic means which project from another face which lies opposite to said one face, said radial extension of the inner ring including projecting portions which engage said elastic means to bias said radial extension of the inner ring against said one face of said radial flange, said bearing being movable radially to a centered position after a declutching operation.

2. A self-centering clutch release bearing assembly according to claim 1 wherein said elastic means includes a plurality of resilient tongues.

3. A self-centering clutch release bearing assembly according to claim 1 or claim 2 wherein the supporting element is made of molded plastic material.

4. A self-centering clutch release bearing assembly according to claim 3 wherein said tongues are arranged in two parallel rows, each of said rows including a plurality of tongues which are disposed parallel to a diameter of said supporting element.

5. A self-centering clutch release bearing assembly according to claim 4 including tongues which are not compressed by said projecting portions of the inner ring to prevent rotational disengagement between said inner ring and said supporting element.

6. A self-centering clutch release bearing assembly according to claim 1 or claim 2 wherein said projecting portions project over the outer edges of said radial flange to engage said elastic means.

7. A self-centering clutch release bearing assembly according to claim 6 wherein there are two said projecting portions which are diametrically opposed on said radial extension.

8. A self-centering clutch release bearing assembly according to claim 4 wherein the elastic means have a configuration which engages the projecting portions to exert a self centering force on the bearing.

9. A self-centering clutch release bearing assembly comprising:
an antifriction bearing having an outer ring for contacting a clutch element, and an inner ring having a radial extension with at least two projecting clamping means;
a supporting sleeve having a tubular guiding portion extending substantially the same length as said bearing to contact a guide tube for axial sliding movement, said supporting sleeve having a radial flange with one face providing an inner radial surface and an opposed face having at least two sets of projecting elastic means which are integral with said flange;
said projecting clamping means contacting and compressing said sets of elastic means to tighten said inner ring axially against said radial flange thus ensuring the self-centering of the release bearing.

* * * * *